April 21, 1959  B. F. TALLENT  2,882,647
OIL COOLED GLASS FORMING TOOLS
Filed Sept. 6, 1955  4 Sheets-Sheet 1

INVENTOR.
B. F. TALLENT
BY Rule and Hoge,
ATTORNEYS

April 21, 1959  B. F. TALLENT  2,882,647
OIL COOLED GLASS FORMING TOOLS
Filed Sept. 6, 1955  4 Sheets-Sheet 2

INVENTOR.
B. F. TALLENT
BY
ATTORNEYS

INVENTOR.
B. F. TALLENT
BY
ATTORNEYS

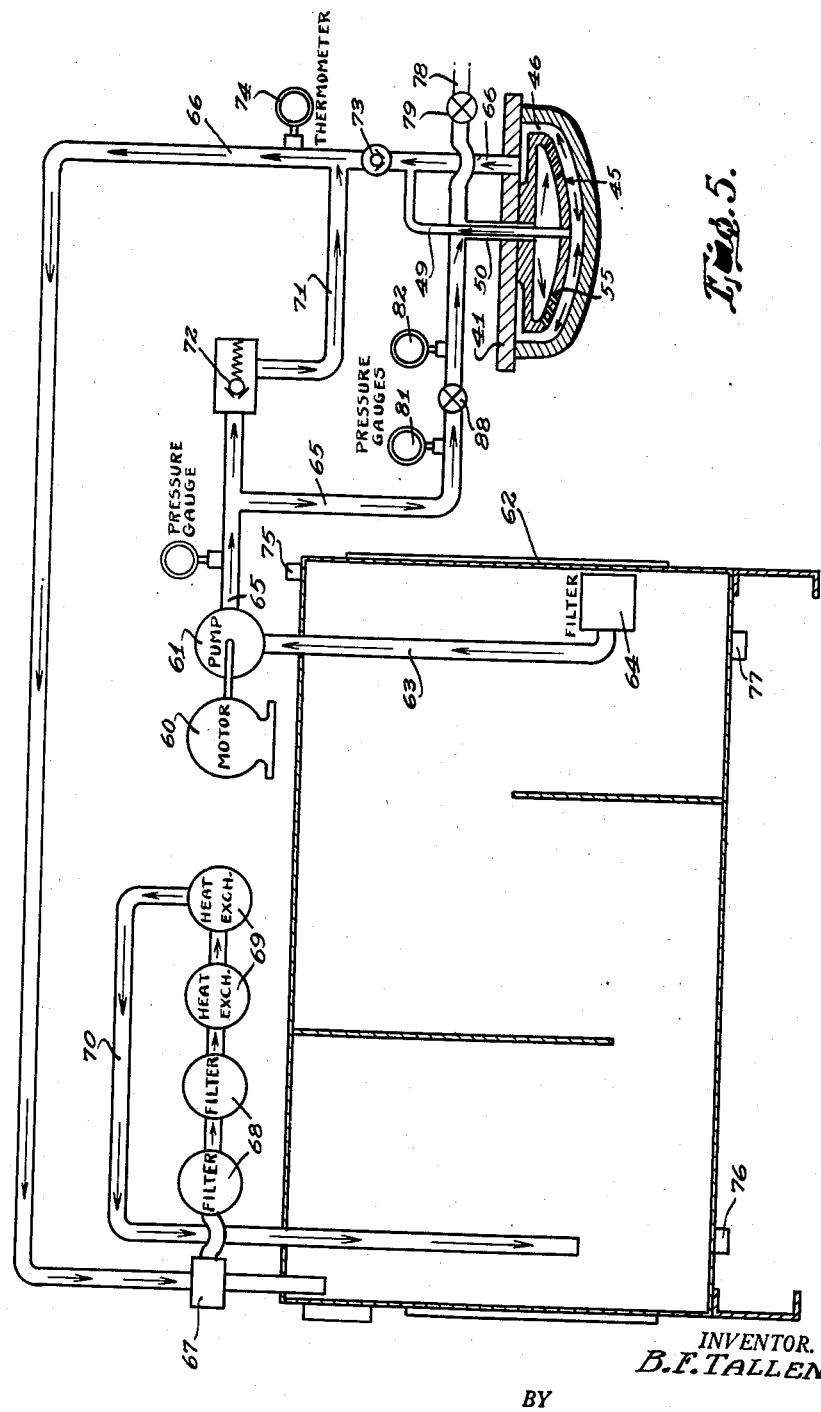

United States Patent Office 2,882,647
Patented Apr. 21, 1959

2,882,647
OIL COOLED GLASS FORMING TOOLS

Benjamin F. Tallent, Toledo, Ohio, assignor to Owens-Illinois Glass Company, a corporation of Ohio Application September 6, 1955, Serial No. 532,646

4 Claims. (Cl. 49—68)

My invention relates to the manufacture of glassware and particularly to means for regulating and controlling the temperature of a glass forming element. The invention in the form herein illustrated provides a novel means for cooling, regulating and maintaining the thermal balance of a press plunger used for pressing and molding hot glass articles in a press mold.

An object of the invention is to provide a novel means for employing a coolant liquid having a higher boiling temperature than water for cooling and regulating the temperature of the press plunger, the cooling liquid consisting preferably of oil. By the use of oil, owing to its high boiling point, it is possible to obtain a thermal balance of the plunger temperature at operating speeds much slower than is practical or possible with a water cooled system. As the plunger when used with oil can be operated at a comparatively high temperature it permits the plunger to remain in contact with the glass until the latter is cooled sufficiently to retain its shape without the support of the molds. The liability to breakage is also greatly reduced or eliminated by maintaining the plunger at such comparatively high temperature. It is also found in practice that the life of the press plunger is materially extended by the use of oil rather than water as a cooling or heat exchange medium.

A further object of the invention is to provide a closed oil circulating system by which a better control of the temperature of the cooling medium at the inlet and outlet can be maintained without expensive equipment.

A further object of the invention is to provide, by the use of oil as a temperature regulating medium, a desirable condition in which the tendency to breakage of the molded ware is reduced or eliminated. The shoulder sections of the press plunger can be operated at comparatively high temperatures without elaborate distributor designs and expensive insulation methods.

A further object of this invention is to obviate the need for water softening equipment and maintenance necessitated where water is used. The problem of water hardness is eliminated by the use of oil.

Other objects of the invention will appear more fully hereinafter.

Referring to the accompanying drawings:

Fig. 5 is a diagrammatic view of the oil circulating system, parts being shown in section.

Figure 1:
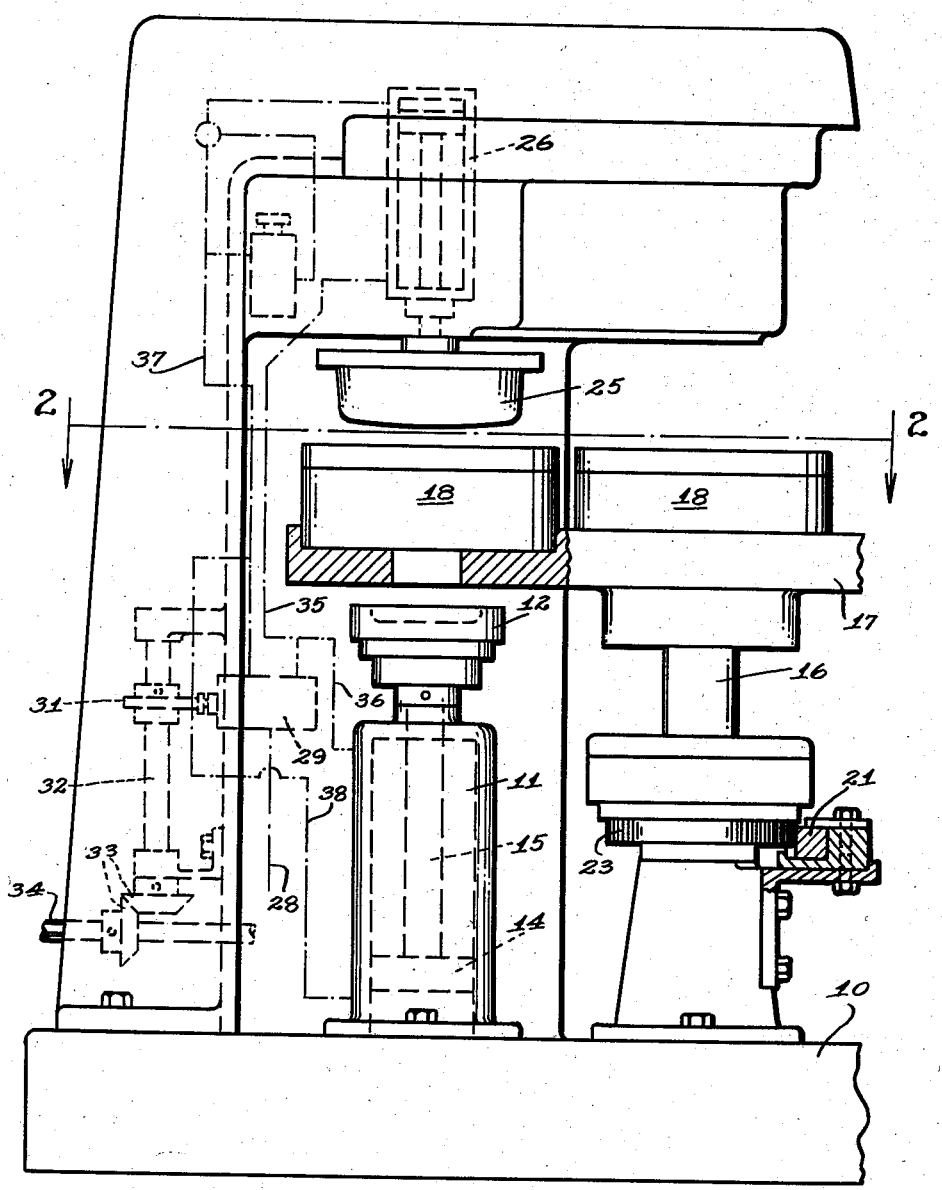
Fig. 1 is an elevational view, partly diagrammatic and with parts broken away, showing a press molding machine with which the present invention is used.
Figure 2:
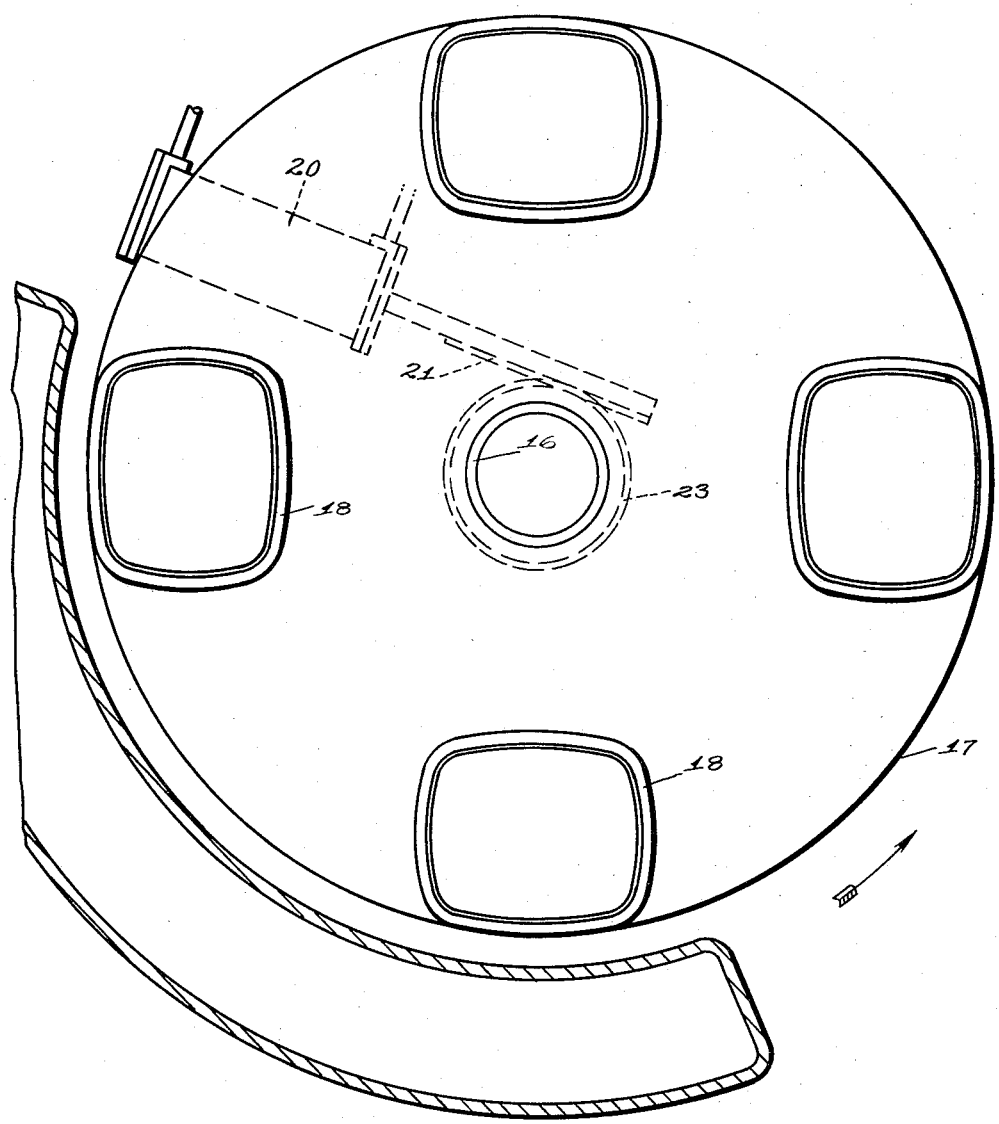
Fig. 2 is a sectional plan view at the line 2—2 of Fig. 1.

Referring particularly to Figs. 1 and 2 which illustrate a press plunger machine of known construction; the machine comprises a base 10 on which is mounted a vertical cylinder 11 for lifting and lowering a supporting plate 12. The motor 11 comprises a piston 14 and piston rod 15 to which the plate 12 is attached.

A vertical column or shaft 16, rotatable about its axis, carries a table 17 on which are mounted press molds 18. The mold table 17 is rotated intermittently, step by step, by a motor 20 (Fig. 2). The motor piston rod has a rack 21 attached thereto running in mesh with a gear 23 secured to the column 16. The rotation of the mold table 17 brings the molds 18 in succession to a press molding station at which the molds are beneath and in register with a press plunger 25 mounted for vertical reciprocation by a motor 26. The motors 11 and 26 are operated by oil or other fluid supplied through a pressure line 28 to a control valve 29. The valve is actuated by a timer cam 31 mounted on a shaft 32 connected through bevel gears 33 to a continuously rotated drive shaft 34. The press plunger 25 is held in its lifted position by fluid pressure supplied through the valve 29 and pipe line 35 leading to the lower end of the cylinder 26. A branch line 36 supplies fluid pressure to the cylinder 11 for lowering the plate 12. When the valve 29 is reversed by the cam 31, pressure is supplied through a pipe line 37 leading to the upper end of the cylinder 26, for lowering the plunger 25, and through a branch pipe line 38 extending to the lower end of the cylinder 11 for lifting the plate 12. The plate 12 provides a bottom support for the mold table 17 during the press molding operation. The machine as illustrated in Figs. 1 and 2 and thus far described in detail is not per se a part of the present invention.

Figure 3:
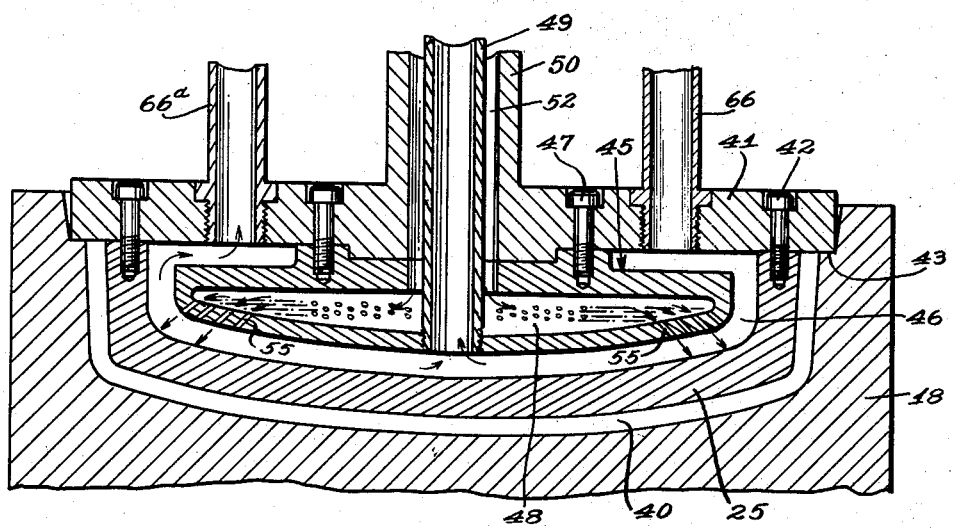
Fig. 3 is a cross sectional elevation showing the press plunger and cooling means.
Figure 4:
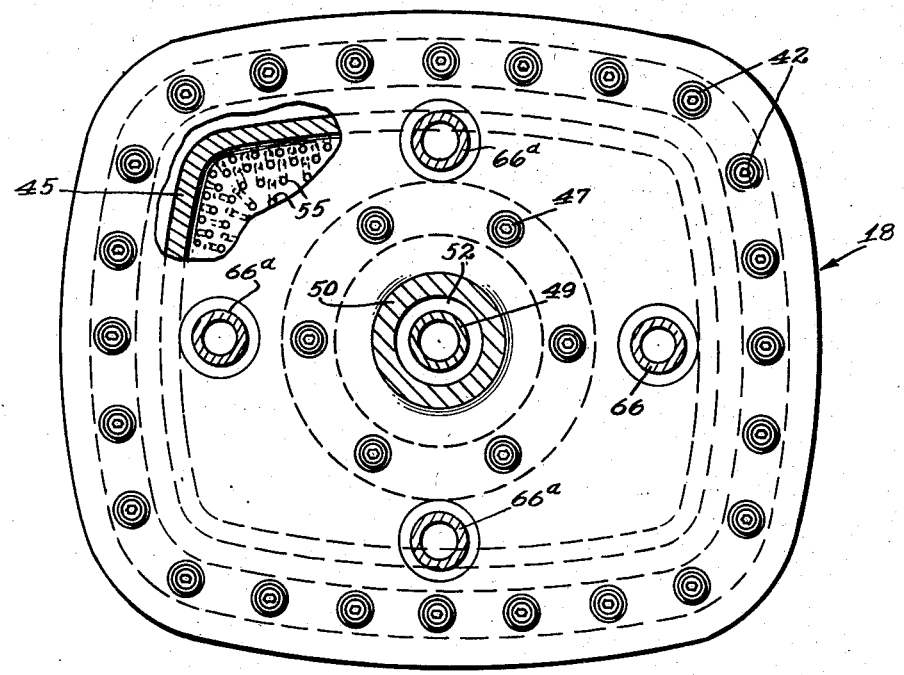
Fig. 4 is a part sectional plan view of the same.

Referring to Figs. 3 and 4 the press mold 18 and plunger 25 are shaped and designed for molding a glass plate or article of approximately rectangular form, such plate being used as a face plate of a television picture tube or the like. The body mold and plunger 25 are spaced to provide a mold cavity 40 in which the glass is molded. Cover plate 41 is attached to the body of the plunger by bolts 42. The mold 18 is formed with a shoulder 43 on which the plate 41 seats and thereby limits the downward movement of the plunger.

A distributor 45 through which the temperature regulating oil is circulated is mounted within the hollow press plunger 25. The distributor is spaced from the inner wall surface of the plunger to provide a space or chamber 46 through which the oil is circulated. The distributor is attached to the plate 41 by bolts 47. The distributor is formed with a chamber 48 through which the oil flows. A vertical tubular stem 49 is attached to the lower wall of the distributor 45 and opens into the chamber 46. The tube 49 extends vertically through a pipe section 50 formed on the plate 41. The pipe 50 is spaced from the tube 49 to provide an annular passage way 52 through which the oil flows to the distributor. The lower wall of the distributor is formed with a multiplicity of holes 55 of predetermined diameter extending therethrough in predetermined directions as required for providing the desired distribution of the circulating oil. As shown these outlet openings 55 are downwardly and outwardly inclined and are arranged adjacent the periphery of the distributor where the greater amount of cooling is required for maintaining a uniformly distributed temperature of the press molding walls.

The oil circulating system as shown in Fig. 5 comprises a motor 60 and a pump 61 driven thereby and drawing oil from the tank or reservoir 62 through a pipe 63. A filter 64 may be provided at the pipe inlet. The pump drives the oil through the pipe line 65 into the distributor 45. The oil is forced from the distributor through the outlets 55 which direct the oil against the inner wall surfaces of the plunger and distribute it within the space 46 to secure the desired cooling of the press plunger in accordance with the required pattern for obtaining a uniform cooling effect. The oil is returned from the chamber 46 through the central tubular stem 49 and a pipe line 66 leading to a three-way hand valve 67. The line 66 includes branch pipes 66ª (Fig. 4). The oil is directed through the valve 67, filters 68 and heat exchange elements 69 which extract heat from the oil, and thence through a pipe 70 into the reservoir 62. The heat exchange elements 69 may be of usual construction comprising pipes through which a cooling fluid is circulated. The valve 67 may be operated to discharge the oil directly into the tank 62.

A portion of the oil is discharged from the pump through a by-pass channel 71 directly into the return pipe 66. A spring loaded check valve 72 is provided in the line 71 and serves as a safety valve while a flow is maintained through the line 65 into the distributor. Oil passing through the by-pass 71 mixes with the heated oil discharged from the plunger, thus serving as a cooling means for the oil. A check valve 73 prevents any possible back flow from the pipe 71 into the plunger head. A thermometer 74 may be provided in the line 66. The oil is introduced into the tank 62 through an opening closed by a cap 75. The tank may be drained at the points 76, 77. Air under pressure may be blown through a pipe 78 and valve 79 and thence through the distributor for cleaning purposes.

A hand operated valve 88 in the line 65 permits regulation of the oil pressure supplied to the distributor. Pressure gauges 81 and 82 are positioned at opposite sides of the valve 88.

As shown in Figs. 3 and 4 a plurality of return pipes may be provided including branch pipes 66ª for controlling the distribution of the return flow of oil from the chamber 46.

Modifications may be resorted to within the spirit and scope of my invention.

I claim:

1. A glass molding machine comprising a press mold formed with a horizontally disposed mold cavity, a press plunger mounted for vertical reciprocating movement into and out of the mold cavity, said plunger formed with a horizontally disposed cavity therein and comprising a horizontal cover plate secured to the body of the plunger, an oil distributor mounted within the cavity in said plunger, means for attaching said distributor to the said cover plate in fixed position relative thereto whereby the distributor has a fixed mounting within the mold cavity and is movable up and down with the plunger as a unit, said distributor being formed with a horizontally disposed chamber therein and having a downwardly facing outer wall surface narrowly spaced from the inner wall surface of the plunger and thereby permitting the circulation of oil between said wall surfaces, said cover plate having a pipe extending upwardly therefrom centrally of said plate and opening downwardly through said plate and into the chamber within said distributor, a vertical tubular stem extending through the said distributor and opening at its lower end into the space between the lower wall of said distributor and the wall surface of the plunger, the wall of the distributing chamber being formed with a multiplicity of jet openings extending therethrough, and means for circulating oil through the distributor and plunger comprising means for forcing oil downwardly through said pipe into the distributing chamber and through said multiplicity of jet openings, a portion of the oil being returned upwardly through said stem, the said jets being arranged in a predetermined pattern for effecting a substantially uniform cooling of the lower wall of the plunger.

2. The machine defined in claim 1, including a plurality of pipes opening through the said cover plate of the plunger into the cavity within the plunger and arranged at intervals around the center of the plate and through which a portion of the oil is returned.

3. The combination defined in claim 1, the oil circulating system including a motor, a pump operated by the motor, an intake pipe line extending from the pump to the distributor chamber, a reservoir, and a return pipe extending from the mold cavity to said reservoir.

4. The combination set forth in claim 3, the circulating system including a by-pass channel extending between the pump and the return pipe, and a spring loaded check valve within said by-pass channel.

References Cited in the file of this patent

UNITED STATES PATENTS

| 519,113 | Grebe | May 1, 1894 |
| 588,173 | Pitt | Aug. 17, 1897 |
| 856,067 | Johns | June 4, 1907 |
| 1,134,200 | Heupel | Apr. 6, 1915 |
| 1,439,372 | Lott | Dec. 19, 1922 |
| 1,536,832 | Evans | May 5, 1925 |
| 1,949,899 | Collins et al. | Mar. 6, 1934 |
| 1,964,600 | Royle | June 26, 1934 |
| 2,527,387 | Arndt | Oct. 24, 1950 |
| 2,536,692 | Miller | Jan. 2, 1951 |
| 2,658,687 | Southworth | Nov. 10, 1953 |
| 2,688,823 | Weber | Sept. 14, 1954 |